UNITED STATES PATENT OFFICE.

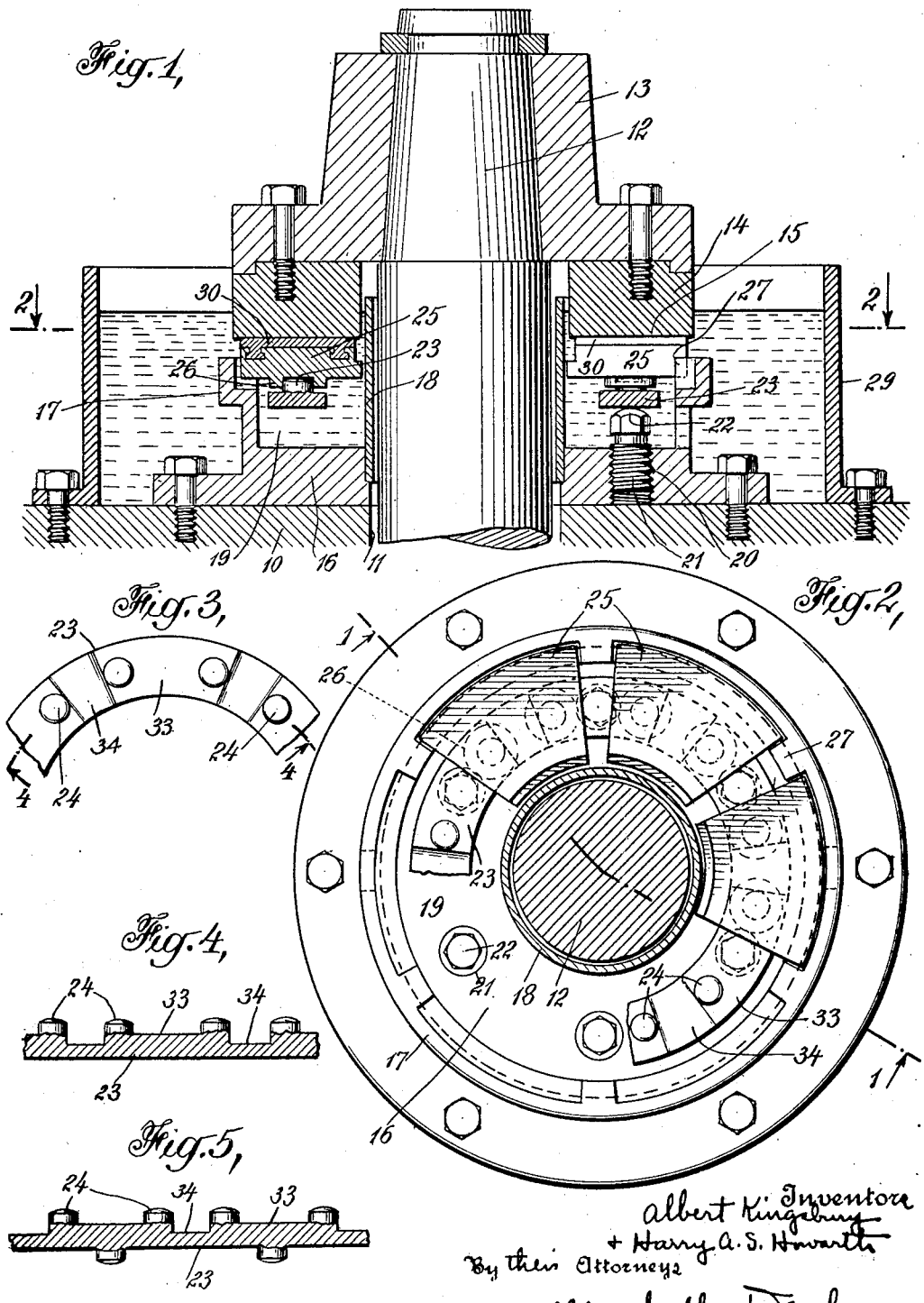

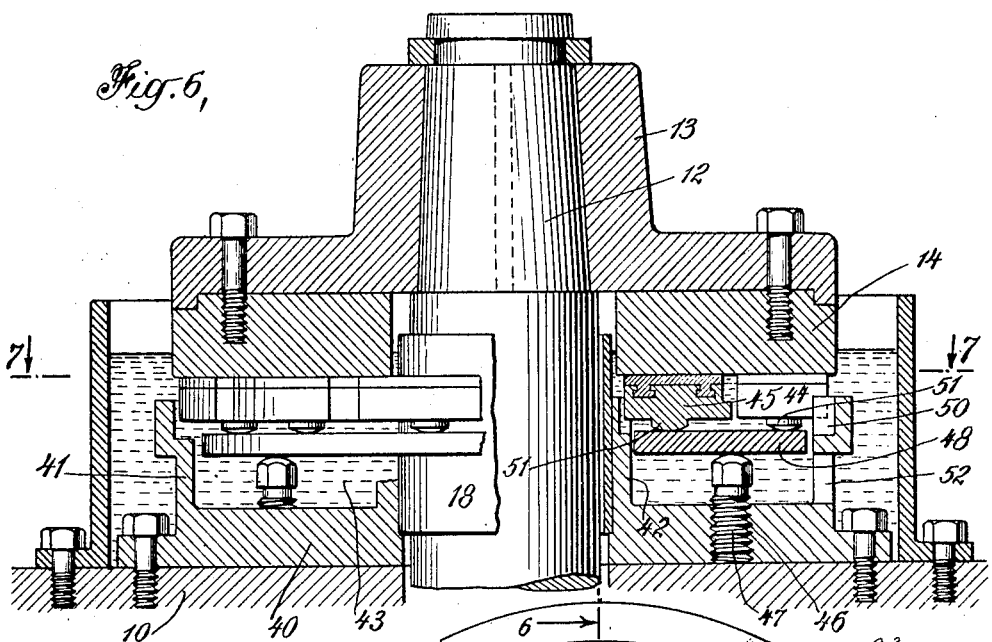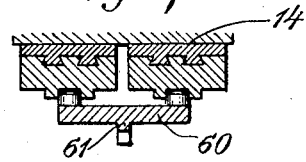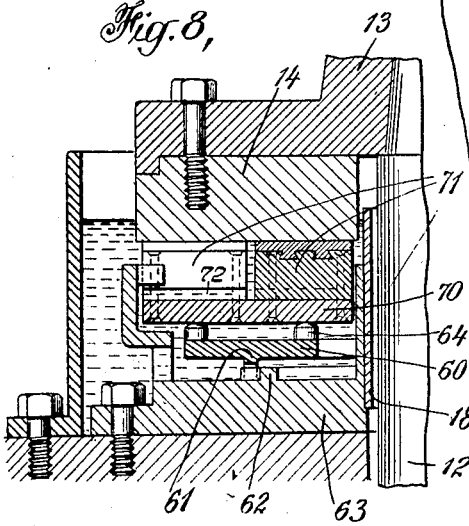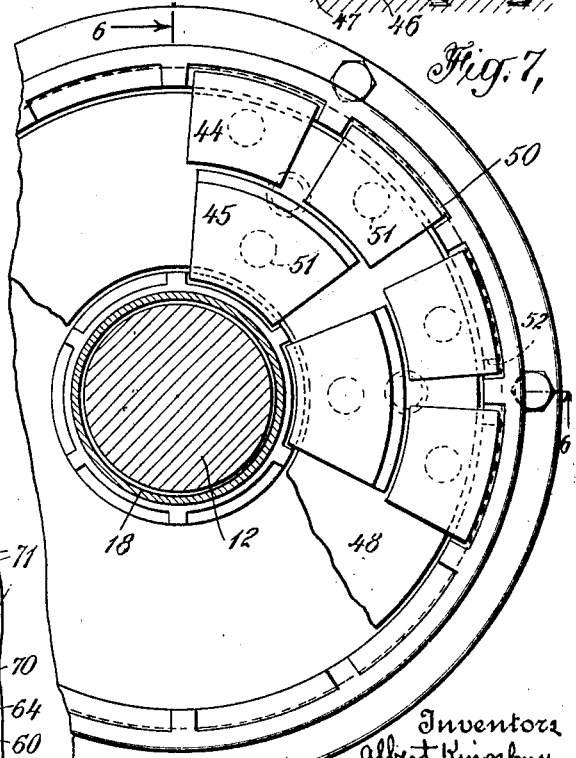

ALBERT KINGSBURY AND HARRY A. S. HOWARTH, OF PITTSBURGH, PENNSYLVANIA; SAID HOWARTH ASSIGNOR TO SAID KINGSBURY.

BEARING.

1,387,930.   Specification of Letters Patent.   Patented Aug. 16, 1921.

Application filed August 29, 1917, Serial No. 188,725. Renewed November 27, 1920. Serial No. 426,848.

*To all whom it may concern:*

Be it known that we, ALBERT KINGSBURY, a citizen of the United States of America, and a resident of Pittsburgh, Allegheny county, and State of Pennsylvania, and HARRY A. S. HOWARTH, a citizen of the United States of America, and a resident of Pittsburgh, Allegheny county, and State of Pennsylvania, have invented certain new and useful Improvements in Bearings, of which the following is a specification, reference being had to the accompanying drawings, forming a part thereof.

Our invention relates to bearings and particularly to thrust bearings which are adapted to support heavy loads and comprises a plurality of bearing members or segments adapted to assume tilted positions by reason of the wedging action of the oil when the bearing is in operation.

One object of our invention is to provide a bearing of the aforesaid character that shall embody a novel means of unitary construction for distributing the pressures over the several members or segments with substantial uniformity, whether the latter be arranged in one or more than one annularly disposed group.

Another object is to provide a simple and effective equalizing support that shall be particularly adapted to carry directly a plurality of bearing segments or shoes arranged in two concentric groups.

Another object is to provide a unitary equalizing support for a plurality of bearing segments or shoes which shall operate to a greater or less degree like a plurality of equalizing supports.

In order that our invention may be thoroughly understood we will now proceed to describe the same in the following specification and then point out the novel features thereof in appended claims.

The invention is capable of receiving a variety of mechanical expressions, some of which are shown on the accompanying drawings, but it is to be expressly understood that the drawings are for purposes of illustration only and are not to be construed as a definition of the limits of the invention, reference being had to the appended claims for that purpose.

Referring to the drawings:

Figure 1 is a sectional elevation, taken on the line 1—1 of Fig. 2, of a thrust bearing which constitutes an embodiment of our invention.

A partially sectional plan view of the same bearing is shown in Fig. 2 which is taken on the line 2—2 of Fig. 1, certain of the shoes being removed to disclose the annular equalizer.

Figs. 3 and 4 are detail views in plan and sectional elevation respectively of the equalizer which forms a part of the bearing shown in Figs. 1 and 2.

A slight modification of the equalizer is illustrated in Fig. 5.

Figs. 6 and 7 correspond respectively to Figs. 1 and 2 and show another embodiment of our invention.

Fig. 8 is a partial elevation of still another embodiment of our invention, and

Fig. 9 shows a slight modification of the structure shown in Fig. 8.

Corresponding parts are designated by the same reference characters in all the figures.

In the form shown in Figs. 1, 2, 3 and 4, 10 represents a stationary frame or foundation having a hole or opening 11, through which a shaft 12 extends. Secured to the shaft at its upper end is a thrust block 13, to which is bolted a thrust collar 14 having a bearing surface 15. A base 16 is bolted or otherwise suitably secured to the frame 10 and is annular in form so that the shaft extends through it. The base has an apertured flange 17 near its outer edge and has affixed to its inner edge a sleeve 18 which surrounds the shaft. A flange 29, suitably attached to the frame or foundation 10, coöperates therewith and with the sleeve 18 to form an oil-well in which the bearing members are disposed.

In the bottom of a channel 19 which is formed by the parts 17 and 18 are a plurality of tapped holes 20 into which screws or studs 21 extend. These screws or studs constitute adjustable supports and have spherically curved tops 22 on which an annular equalizer 23 is mounted. As clearly shown in Figs. 3 and 4 the equalizing ring has upwardly extending projections 24 which are provided with rounded tops and constitute pivotal supports for the bearing members or shoes 25. Each bearing shoe has a pair of recessed lugs 26 into which a pair of adjacent projections 24 of the equalizing ring 23 extend.

The equalizing ring is composed of rigid sections 33 joined by flexible webs 34, the upwardly extending projections 24 being located at the respective ends of the rigid sections. The arrangement of parts is such that each shoe bridges the adjacent ends of a pair of rigid sections 33 and is directly over one of the flexible webs 34.

The outer edges of the shoes fit loosely between lugs 27 on the flange 17 while the inner edges are close to the sleeve 18 so that the shoes are prevented from rotating about their pivot supports and from revolving about the shaft. The shoes are preferably faced with soft metal as indicated at 30, and coöperate with the bearing surface 15 of the thrust collar. They are free to assume a tilted position in operation in response to the wedging action of the oil in which the bearing surfaces are immersed, because of the flexibility of the webs 34 and the pivotal nature of the support on which the equalizing ring is mounted; and they are also free to tilt radially on the projections 24, 24 at the two ends of each shoe.

The screws 21 constitute convenient adjustable means for supporting the equalizing ring 23, but no adjustment is essential to our invention and each of the rigid sections 33 of the ring may have a downwardly extending pivot projection as shown in the embodiment of Fig. 5. The arrangement of the projections 24 and recessed lugs 26 could also be reversed without departing from the spirit of our invention.

In the form shown in Figs. 6 and 7, a base 40, which takes the place of the base 16, has an outer apertured flange 41 and an inner flange 42 providing an annular channel 43 in which the bearing shoes 44 and 45, shown as arranged in two concentric groups, are mounted.

The base is provided with tapped holes 46 into which screws or studs 47 extend, and a flexible ring 48 is mounted in the channel upon the curved heads of the screws or studs 47. The shoes 44 extend loosely into recesses 50 in the flange 41, and both groups of shoes are loosely mounted upon the flexible supporting ring 48 as clearly shown in Fig. 7. Each shoe is provided with a downwardly extending projection 51 having a spherically curved bottom surface which is seated on the flexible ring and constitutes a pivotal support so that the shoe is free to tilt in operation.

The screws or studs 47 engage the bottom of the flexible ring 48 between its inner and outer edges and in such places as to properly support the several groups of shoes. As the shoes 44 engage the top surface of the ring near its outer edge and the shoes 45 near its inner edge, the flexible ring is able to perform its function of a pivoted equalizer and uniformly distributes the load upon the shoes. The flexible ring may be modified as shown in Figs. 8 and 9 as hereinafter described.

Referring to Figs. 8 and 9, the equalizing ring 48 of Figs. 6 and 7 is replaced by a flexible ring 60 which has an annular projection 61 concentric with the shaft and coöperating with a rib 62 of the base 63, which takes the place of the base 40. A continuous rib therefore takes the place of the annularly-arranged plurality of separate supports 47 of the embodiment of Figs. 6 and 7, and the support for said equalizing ring is mounted on said ring instead of on the base as in said embodiment of Figs. 6 and 7. The flexible ring has upwardly extending projections 64 which correspond to the downwardly extending projections 51 of Figs. 6 and 7 and upon which either individual bearing shoes are mounted, as shown in Fig. 9, or a shoe structure is mounted as shown in Fig. 8. This last mentioned structure consists of a flexible ring 70 to which a plurality of bearing shoes 71 having relatively thin downwardly extending transverse webs 72 are affixed by rivets or some other suitable means. The shoes 71 and the thin web supports 72 may of course be integral with the flexible ring member, if desired.

It is also evident that in the structure of Figs. 1 and 2 the shoes may be joined by flexible webs instead of being made independent as shown. The recessed lugs for receiving the pivotal projections could also be omitted without departing from the spirit of this invention, and any other suitable form of pivotal mounting or connection may be employed between the equalizing ring and its support and the bearing segments. Various other structural modifications may be effected within the spirit and scope of our invention, and we intend only such limitations as are imposed by the appended claims.

This application is a continuation in part of our copending application Serial No. 89,001, filed April 5, 1916, and Serial No. 95,557 filed May 5, 1916, and relates particularly to an equalizer which is annularly continuous, and which carries shoes or bearing members that are tiltable relative thereto and independently thereof.

What we claim is:

1. A bearing comprising a plurality of circumferentially arranged spaced supports, a resilient ring mounted on said supports, and a plurality of bearing shoes pivotally supported on the resilient ring.

2. A bearing comprising a resilient ring supported at a series of points substantially in its medial line, and a plurality of bearing shoes tiltably mounted on the resilient ring.

3. A thrust bearing comprising a base having upwardly extending projections, a plurality of bearing shoes, and an interposed equalizing member comprising relatively rigid portions mounted on said projections and relatively flexible portions connecting the adjacent ends of the rigid portions.

4. A thrust bearing comprising a base, a plurality of bearing shoes and an interposed equalizing member comprising relatively rigid portions connected by relatively flexible portions, and means for equalizing the pressure on the rigid portions.

5. A thrust bearing comprising a base having upwardly extending projections, a plurality of bearing shoes, and an interposed equalizer mounted on said projections and composed of relatively rigid portions connected by flexible portions, each of said shoes bridging the adjacent ends of and supported by a pair of said rigid portions.

6. A thrust bearing comprising a base, a plurality of bearing shoes, and an interposed equalizer composed of relatively rigid portions connected by flexible portions, each of said shoes bridging the adjacent ends of and supported by a pair of said rigid portions, and means for equalizing the pressure on the rigid portions.

7. A thrust bearing comprising a base, an equalizer composed of relatively rigid portions connected by flexible portions, spaced projections extending from one of said parts for supporting the equalizer, and a plurality of bearing shoes, each of said shoes bridging the adjacent ends of and supported by a pair of said rigid portions of the equalizer.

8. A thrust bearing comprising a base having upwardly extending projections, a plurality of bearing shoes, and an interposed equalizer mounted on said projections and composed of relatively rigid portions connected by flexible portions, each of said shoes being mounted on the equalizer opposite a flexible portion thereof.

9. A thrust bearing comprising a base, an equalizer supported at spaced points thereon and composed of relatively rigid portions having upwardly extending projections and connected by flexible portions, and a plurality of bearing shoes pivotally mounted on the upwardly extending projections of the equalizer.

10. A bearing comprising a base, a resilient ring tiltably mounted thereon, and a plurality of bearing shoes pivotally supported directly on the resilient ring.

11. A thrust bearing comprising a base, a plurality of bearing shoes and an annular equalizing member having alternate rigid and resilient portions interposed between the base and the shoes and constituting a pivotal supporting means which permits the shoes to tilt relatively to the base.

12. A thrust bearing comprising a base, a plurality of bearing shoes, an annular equalizing member having alternate rigid and resilient portions interposed between the base and the shoes and constituting a pivotal supporting means which permits the shoes to tilt relatively to the base, and means for equalizing the pressure on the rigid portions of the equalizing member.

13. A bearing comprising a base, a plurality of bearing segments, and an interposed equalizing member comprising relatively rigid portions and relatively flexible portions connecting said rigid portions.

14. A bearing comprising a base, a plurality of bearing segments, and an interposed equalizing member comprising relatively rigid portions and relatively flexible portions connecting said rigid portions, each of said bearing segments bridging the adjacent ends of and supported by a pair of said rigid portions.

15. A bearing comprising a base, a plurality of bearing segments, an interposed equalizing member comprising relatively rigid portions connected by flexible portions, and means pivotally mounting said equalizing member on said base.

16. A bearing comprising a base, a plurality of bearing segments, an interposed equalizing member comprising relatively rigid portions connected by flexible portions, and means tiltably mounting said rigid portions on said base.

17. A bearing comprising a base, a plurality of bearing segments, an interposed equalizing member comprising relatively rigid portions connected by flexible portions, and means between said base and equalizing member whereby said rigid portions are mounted for universal pivoting movement.

18. A bearing comprising a base, a plurality of bearing segments, an interposed equalizing member comprising relatively rigid portions connected by flexible portions, and projections intermediate said base and rigid portions for pivotally mounting said equalizing member.

19. A bearing comprising a base, a plurality of bearing segments, an interposed equalizing member comprising relatively rigid portions connected by flexible portions, each of said segments being mounted on said equalizing member opposite a flexible portion thereof, and means tiltably mounting said rigid portions on said base.

20. A bearing comprising a plurality of bearing segments and an equalizing member on which said segments are tiltably mounted, said equalizing member comprising relatively rigid portions connected by flexible portions.

21. A bearing comprising a plurality of bearing segments and an equalizing member comprising relatively rigid portions connected by flexible portions, each of said segments being mounted on two adjacent rigid portions.

22. A bearing comprising a plurality of bearing segments and an equalizing member comprising relatively rigid portions connected by flexible portions, each of said segments being mounted at circumferentially spaced points on said equalizing portions.

23. A bearing comprising a plurality of bearing segments and an equalizing member comprising relatively rigid portions connected by flexible portions, each of said segments being mounted on said equalizing member opposite one of said flexible portions.

24. A bearing comprising a base, a plurality of bearing segments, and an interposed equalizing member comprising relatively rigid portions tiltably mounted on said base and connected by flexible portions.

25. A bearing comprising a base, a plurality of bearing segments, and an interposed equalizing member on which said bearing segments are tiltably mounted, said equalizing member comprising relatively rigid portions tiltably mounted on said base and connected by flexible portions.

26. A bearing comprising a base, a single series of consecutive bearing segments, a flexible equalizing member on which said segments are mounted to tilt with respect thereto, and means pivotally mounting said equalizing member.

27. A bearing comprising a base, a single series of consecutive bearing segments, a flexible equalizing member on which said segments are mounted to tilt with respect thereto, and means disposed substantially at the medial line of said equalizing member for pivotally mounting the same.

28. A bearing comprising a base, an equalizing member mounted on said base and comprising relatively rigid portions connected by flexible portions, and bearing segments mounted on said equalizing member to tilt radially with respect thereto.

In witness whereof, we have hereunto set our hands this 27 day of August, 1917.

ALBERT KINGSBURY.
HARRY A. S. HOWARTH.